(12) United States Patent
Katayama

(10) Patent No.: US 6,906,827 B1
(45) Date of Patent: Jun. 14, 2005

(54) COLOR IMAGE PROCESSOR

(75) Inventor: Shigeki Katayama, Tokyo (JP)

(73) Assignee: NEC Corporation, Tokyo (JP)

( * ) Notice: Subject to any disclaimer, the term of this patent is extended or adjusted under 35 U.S.C. 154(b) by 1005 days.

(21) Appl. No.: 09/610,662

(22) Filed: Jul. 5, 2000

(30) Foreign Application Priority Data

Jul. 7, 1999 (JP) .......................................... 11-193423

(51) Int. Cl.$^7$ .............................. G06F 15/00; G06K 1/00
(52) U.S. Cl. .................... 358/1.9; 358/518; 358/529; 358/2.1; 358/462; 382/176; 382/162; 382/167
(58) Field of Search ................................. 358/518, 529, 358/2.1, 462; 382/176, 162, 167

(56) References Cited

U.S. PATENT DOCUMENTS

| | | | |
|---|---|---|---|
| 5,359,437 A | 10/1994 | Hibi ............................ | 358/529 |
| 5,502,579 A | 3/1996 | Kita et al. ................... | 358/518 |
| 5,742,410 A * | 4/1998 | Suzuki ........................ | 358/518 |
| 5,907,415 A * | 5/1999 | Yabe ............................ | 358/518 |
| 5,920,645 A | 7/1999 | Aida | |
| 6,118,550 A | 9/2000 | Hayashi | |
| 6,313,924 B2 * | 11/2001 | Kanamori .................... | 358/1.9 |
| 6,456,404 B1 * | 9/2002 | Furuya et al. ............... | 358/523 |
| 6,636,630 B1 * | 10/2003 | Adachi et al. .............. | 382/176 |
| 6,674,546 B1 * | 1/2004 | Nakahara .................... | 358/1.9 |

FOREIGN PATENT DOCUMENTS

| | | |
|---|---|---|
| JP | 1-275141 | 11/1989 |
| JP | 4-317259 | 11/1992 |
| JP | 5-344328 | 12/1993 |
| JP | 7-87346 | 3/1995 |
| JP | 8-65530 | 3/1996 |
| JP | 09-233323 | * 5/1997 |
| JP | 10-51651 | 2/1998 |
| JP | 10-233928 | 9/1998 |
| JP | 10-271327 | 10/1998 |

* cited by examiner

Primary Examiner—Kimberly Williams
Assistant Examiner—Michael Burleson
(74) Attorney, Agent, or Firm—Foley & Lardner LLP

(57) ABSTRACT

In a color image processor for converting a RGB input image data into a CMYK image output data, it is determined whether a data format of the input image data is a non-picture image format or a picture image format. For the input image data of the non-picture image format, a color conversion is performed with values of C, M and Y colors made minimum and a value of K color made maximum, when values of all of the R, G and B colors are minimum, and, for the input image data of the picture image format, a color conversion is performed with the values of the C, M and Y colors set to temporary values slightly smaller than the maximum values thereof when values of all of the R, G and B colors are minimum. Final C, M, Y and K colors are obtained by performing the Black-Generation and Under-Color-Removal processing for the temporary values.

4 Claims, 4 Drawing Sheets

| input RGB | output C' M' Y' |
|---|---|
| 0 , 0 , 0 | 255, 255, 255 |
| 0 , 0 , 32 | 255, 255, 200 |
| ⋮ | ⋮ |
| 255, 255, 255 | 0 , 0 , 0 |

FIG.2a

| input RGB | output C' M' Y' |
|---|---|
| 0 , 0 , 0 | 254, 254, 254 |
| 0 , 0 , 32 | 255, 255, 200 |
| ⋮ | ⋮ |
| 255, 255, 255 | 0 , 0 , 0 |

FIG.2b

COLOR IMAGE PROCESSOR

CROSS REFERENCE TO RELATED APPLICATIONS

The present invention claims priority from Japanese Patent Application No. 11-193423 filed Jul. 7, 1999, the contents of which are incorporated herein by reference.

BACKGROUND OF THE INVENTION

1. Field of the Invention

The present invention relates to a color image processor for converting a RGB data composed of respective Red, Green and Blue color separated signals used in a color input device into a CMYK data composed of respective Cyan, Magenta, Yellow and Black signals used in a color image recording system and, particularly, to an optimization of an output of a color document containing character images and picture images in a mixed state.

2. Description of Related Art

A color input device such as scanner, monitor or digital camera, etc., usually uses the RGB color space for a color management. On the other hand, a color management of a color output device such as printer or copier, etc., is performed by using the CMYK color space. Therefore, a color space conversion is required between the color input device and the color output device.

In general, the conversion of the RGB data into the CMYK data is achieved by, first, converting R, G and B colors into C, M and Y colors with using the complementary color conversion or the Look-Up-Table (LUT) for color conversion and, then, obtaining K (black color) information by performing the Black-Generation and Under-Color-Removal (BG/UCR) processing. In this specification, the data generated from R, G and B color information with using the LUT is referred to as C'M'Y' data and the data generated from the C'M'Y' data with using the BG/UCR processing is referred to as CMYK data.

The BG/UCR processing is advantageous in view of improvement of an image contrast and restriction of toner consumption, etc. However, it is detrimental in view of degradation of chromaticness in high chromaticness region. Further, since toners for C, M and Y colors have no ideal chromogenic characteristics, a balance in concentration between the CMY data and K data is degraded with increase of the amount of the BG/UCR processing.

It is preferable, in order to maintain the sharpness thereof, to print a character image by using only the K (black) plate and, therefore, the BG/UCR processing is indispensable for the character image printing. On the other hand, in a case of an image such as a picture image, which requires the continuity of gradation of chromaticness as well as colors, it is preferable to perform a color reproduction by C, M and Y colors for substantially entire input gradation values. In such case, the BG/UCR processing may generally restrict the picture image.

In outputting a color document containing a character image and a picture image in a mixed state, it is desired that the character image is reproduced by monotone using the K plate and a substantial portion of the picture image is reproduced by C, M and Y colors simultaneously with the black character image. However, when characters are to be printed by using only the K plate, it becomes necessary to perform the BG/UCR processing for the black solid input C'M'Y'data such that the data is replaced by data of the K plate. Since the BG/UCR processing is also applied to the picture image, a black solid portion of the picture image is reproduced by monochromatic black color of the K plate. That is, since the black solid portion in the picture image is reproduced by the K color while the other portion of the image area than the black solid portion is reproduced by C, M and Y colors or C, M, Y and K colors, there is a clear gap in hue, chromaticness or lightness in a boarder area between the black solid portion and the other portion depending upon the chromogenic characteristics of the C, M and Y toners. In order to solve this problem, it is necessary to restrict the amount of the BG/UCR processing for the black solid input C'M'Y' data to thereby remove portion or portions of the image, which are reproduced by using only the K plate. In such case, however, it is, of course, impossible to reproduce the character image by only K color.

There have been many proposals for performing the BG/UCR processing appropriate for low chromaticness region and the BG/UCR processing appropriate for high chromaticness region. For example, Japanese Patent Application Laid-open No. H7-087346 discloses a technique in which an information of chromaticity, lightness and chromaticness is obtained by converting an input RGB data into a L*a*b* data, an UCR rate is determined by non-linearly operating a chromaticness signal and four color image output signal including K form is determined on the basis of the UCR rate and the L*a*b* value. Further, Japanese Patent Publication No. H7-36609 (corresponding to Japanese Patent Application Laid-open No. H4-317259) discloses a technique in which a chromaticness information is obtained by an input value and, after the BG/UCR processing is performed correspondingly to the thus obtained chromaticness information value, amounts of C, M, Y and K are corrected again by performing the Under-Color-Addition (UCA) processing. With using these techniques, it is possible to simultaneously realize the reproduction of a character image with only K color and the restriction of amount of the BG/UCR processing for a high chromaticness region of a picture image.

However, since, in these prior arts, the BG/UCR processing optimized for low chromaticness region is performed in a solid black portion or a portion close to solid black portion of a picture image, the solid black portion, etc., is reproduced with only K color and a peripheral portion thereof is reproduced with C, M, Y and K colors. Therefore, the problem of the gap in hue, chromaticness or lightness can not be solved. Further, since any of the mentioned prior arts has developed under consideration that simultaneous realization of high quality reproduction of both colorless region and colored region is the highest priority, problems of increase of a data processing time and increase of F/W memory capacity are left as they are.

Further, in outputting a color document containing a character image and a picture image in a mixed state, it is possible to reproduce the characters with using only the K plate by optimizing the BG/UCR processing therefor. However, such optimized BG/UCR processing is not always appropriate in reproducing the picture image. That is, since the solid black portion of the picture image is reproduced by only the monotone of the K plate, there is a gap in color, chromaticness or lightness in the boarder region between the solid black portion and other portion printed with three or four colors, which are contained in the picture image. This is because the chromogenic characteristics of toners of C, M and Y colors are not ideal and the balance in concentration between C, M and Y colors and the K color is broken when the amount of the BG/UCR processing is increased, as mentioned previously. Therefore, in order to avoid such gap, it has been necessary to sacrifice the quality of either character or picture.

SUMMARY OF THE INVENTION

An object of the present invention is to optimize an output of a color document containing a character image and a picture image in a mixed state.

Another object of the present invention is to remove gap of hue, lightness or chromaticness in both a low chromaticness region and a high chromaticness region and to reproduce the character image by K color, simultaneously.

According to the present invention, a color image processor for converting an input image data (RGB data) composed of color separated signals of red, green and blue colors into an image output data (CMYK data) composed of color output signals of cyan, magenta, yellow and black colors is provided, which is featured by comprising an object identifying circuit for identifying a data format of the input image data is non-picture image format or a picture image format, first processing means for performing a color conversion of a non-picture image format identified by the object identifying circuit and making values of the color output signals (C, M and Y) of cyan, magenta and yellow colors minimum and values of the color output signal of black color (K) maximum when values of all of the color separation signals (R, G and B) are minimum, and second processing means for performing a color conversion of the input image data of the picture image format identified by the object identifying circuit, setting values of the color output signals (C, M and Y) of cyan, magenta and yellow colors to temporary values (C', M' and Y') slightly smaller than the maximum values and obtaining final color output signals (C, M, Y and K) of cyan, magenta, yellow and black colors by performing a Black Generation and Under-Color-Removal (BG/UCR) processing of the temporary values correspondingly to a color output device.

The second processing means may perform the Black Generation processing and Under-Color-Removal (BG/UCR) processing by using a Look-Up-Table which is independent from a Look-Up-Table of the first processing. However, the first and second processing means may use a common Look-Up-Table. That is, the color image processor of the present invention further comprises BG/UCR processing means used commonly by the first and second processing means to perform the Black Generation and Under-Color-Removal processing, wherein the first processing means includes a first color conversion circuit for performing a color conversion of a non-picture image format identified by the object identifying circuit, making values of the color output signals (C, M and Y) of cyan, magenta and yellow colors minimum and values of the color output signal of black color (K) maximum when values of all of the color separation signals (R, G and B) are minimum and outputting the color output signals (C', M' and Y') having maximum values to the BG/UCR processing means and the second processing means includes a second color conversion circuit for performing a color conversion of the input image data of the picture image format identified by the object identifying circuit, setting values of the color output signals (C, M and Y) of cyan, magenta and yellow colors to temporary values (C', M' and Y') slightly smaller than the maximum values and obtaining final color output signals (C, M, Y and K) of cyan, magenta, yellow and black colors by performing the Black Generation and Under-Color-Removal processing of the temporary values correspondingly to a color output device and outputting the color output signals (C, M, Y and K) to the BG/UCR processing means, and wherein the BG/UCR processing means may includes a Look-Up-Table for outputting an image output data (C, M, Y, K), which corresponds to the color output device and contains color output signals of cyan, magenta and yellow colors having minimum values and a color output signal of black color having maximum value for a color input signals (C', M' and Y) of cyan, magenta and yellow colors having maximum values and outputting an image output data (C, M, Y, K), which corresponds to the color output device and contains color output signals of cyan, magenta and yellow colors at least one of which has a value smaller than the maximum value thereof, to the BG/UCR processing means.

In the Look-Up-Table, the amount of the Black Generation and Under-Color-Removal processing with which the continuity of adjacent points between the non-picture image format and the picture image format can be maintained are set. Particularly, it is preferable that the amounts of the Black Generation and Under-Color-Removal processing is set in only color regions in which all of the color output signals of cyan, magenta and yellow colors have values close to the maximum values thereof.

BRIEF DESCRIPTION OF THE DRAWINGS

Specific embodiments of the present invention will now be described, by way of example only, with reference to the accompanying of drawings in which:

FIGS. 2a and 2b show examples of correspondences between input values and output values of color conversion circuits, respectively;

DETAILED DESCRIPTION OF THE PREFERRED EMBODIMENTS

Figure 1:
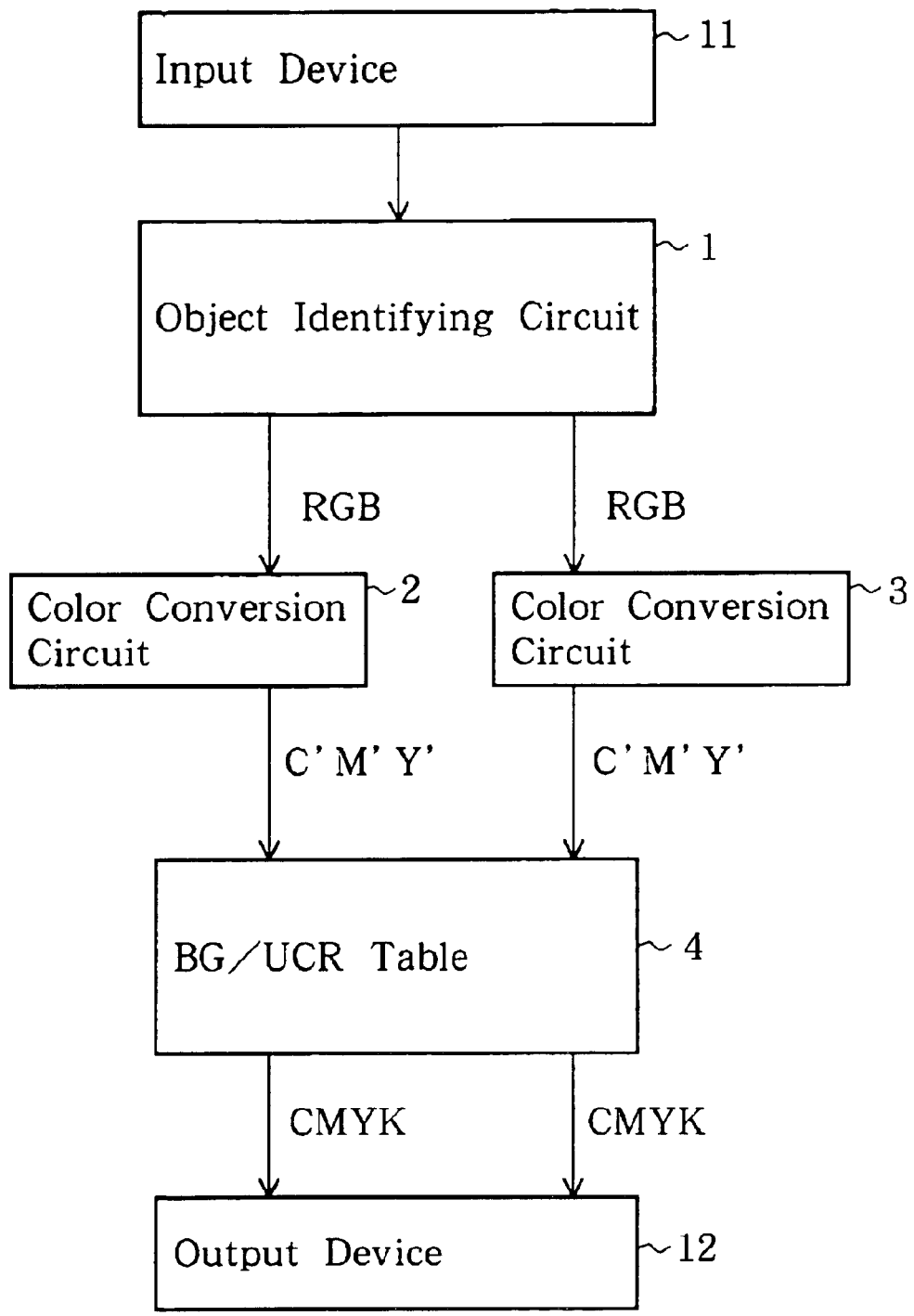
FIG. 1 is a block circuit diagram showing a construction of a color image processor according to a first embodiment of the present invention.

Referring to FIG. 1, a color image processor for converting an RGB input image data inputted from an input device 11 into a CMYK image output data and supplying the latter to an output device 12 comprises an object identifying circuit 1 for identifying a data format of the input image data as a non-picture image format or a picture image format, a first color conversion circuit 2 for converting an RGB input image data of the non-picture image format into a C'M'Y' image data and outputting all of C', M' and Y' data as having maximum values when all of R, G and B data have minimum values, a second color conversion circuit 3 for converting an RGB input image data of the picture image data format into a C'M'Y' image data, setting the values of C', M' and Y' color data to values slightly smaller than the maximum values thereof, respectively, when all of the R, G and B color data have the minimum values, respectively, and outputting the C'M'Y' data having the thus set values and a BG/UCR table 4 for outputting an image output CMYK data including C, M and Y colors having minimum values and K having maximum value for an input including C', M' and Y' having maximum values thereof, respectively, and outputting a CMYK data corresponding to a color printer 12 for an input including C', M' and Y' at least one of which has a value smaller than the maximum value thereof.

In general, the input device 11 may include a monitor for displaying an image signal read out from a photoelectric converter, a scanner for reading a color image of a photograph or a catalog, etc., by means of a photoelectric conversion element or a digital camera storing an objective image by means of a CCD or a CMOS sensor, etc. Such input device 11 usually uses a RGB color space. However, the output device 12, for example, a printer uses a CMYK space as the color space. Therefore, it is necessary to convert the color space from RGB into CMYK. Such conversion may be achieved by a direct color conversion from RGB to CMYK by using a color conversion table called Look-Up-Table (LUT). In this embodiment, however, in order to perform a higher color management, a method is employed, in which a conversion of a RGB data into a C'M'Y' data is performed first and then the C'M'Y' data is converted into a CMYK data.

In the following description, each of R, G and B color data has a gradation of 8 bits so that a gradation value in a range from 0 to 255 can be used. The gradation of each of R, G and B data is usually represented by 8 bits. It should be noted that, if the gradation of each color is represented by 4 bits, the gradation value can take a value in a range from 0 to 16. Further, if, in order to improve the preciseness, the gradation is represented by 9 bits, the gradation value becomes in a range from 0 to 511. If the gradation of each color is represented by 16 bits, the gradation can take a value in a range from 0 to 65535. The present invention can be applied similarly to any of such cases as mentioned above.

The object identifying circuit 1 identifies a difference of object contained in the input image data. That is, the object identifying circuit 1 identifies on the basis of an information of printing data by determining whether the object has a non-picture image format such as character format or an image format of a dot type. Data of the non-picture image format is outputted to the color conversion circuit 2 and data of the picture image format is outputted to the color conversion circuit 3.

The color conversion circuits 2 and 3 convert the RGB data into the C'M'Y' data, respectively. The conversion of the RGB data into the C'M'Y' data is usually realized by referencing the LUT for performing a complementary color conversion or color matching. In this embodiment, it is assumed that the color conversion circuit 2 is a LUT optimized for an output of a non-picture data such as characters and graphics, etc., and the color conversion circuit 3 is a LUT optimized for an output of a picture data. It should be noted, however, that the optimization of the color conversion circuits 2 and 3 can be freely set provided that conditions to be described later are satisfied.

The BG/UCR table 4 converts C', M' and Y' obtained by the color conversion circuits 2 and 3 into C, M, Y and K. In general, BG/UCR is represented by the following equations as a function of k, which is the minimum value of C'M'Y':

$$k = \min(C', M', Y') \quad (1)$$

$$C = C' - UCR(k) \quad (2)$$

$$M = M' - UCR(k) \quad (3)$$

$$Y = Y' - UCR(k) \quad (4)$$

$$K = BG(k) \quad (5)$$

This is true for this embodiment. In the following description, a generation of a BG/UCR amount equal to the minimum value of C'M'Y', that is, a case of BG(k)=UCR(k)=k, is represented by 100% Bg/UCR. The BG/UCR table 4 outputs CMYK by this processing and completes the color conversion. After the color conversion is completed, the CMYK signal is supplied to a printer engine to obtain a high quality print having the continuity with which a character image can not be distinguished from a picture image.

The color conversion circuits 2 and 3 will be described in detail with reference to FIGS. 2a and 2b.

The color conversion of RGB data supplied to the color conversion circuit 2 is performed by the LUT optimized for character and graphics. It is assumed that, when a solid black data (R, G, B)=(0, 0, 0) is inputted, the color conversion circuit 2 always converts it into (C', M', Y')=(255, 255, 255). Further, the color conversion of the RGB data supplied to the color conversion circuit 3 is performed by the LUT optimized for photograph. It is assumed that the color conversion circuit 3 converts a solid black input RGB data not into (C', M', Y')=(255, 255, 255) but into a value close to (C', M', Y')=(255, 255, 255). That is, the color conversion circuit 3 outputs (C', M', Y')=(k, k, k) where k is 254 or less and close to a solid black. An example is (C', M', Y')=(254, 254, 254). Although k is not limited to 254, it is preferable in order to obtain a print close to a solid black to set k to 254.

The C'M'Y'data generated by the color conversion circuit 2 or 3 is BG/UCR-processed. The BG/UCR table 4 used in such BG/UCR processing of the (C', M', Y') data will be described.

The BG/UCR table 4 outputs (C, M, Y, K)=(0, 0, 0, 255) for the input of (C', M', Y')=(255, 255, 255) and outputs (C, M, Y, K) value with restricted BG/UCR amount for the input of (C', M', Y') input with the minimum values of respective C', M' and Y' being 254 or less. With this scheme, it is possible to reproduce the character image, which is (C', M', Y')=(255, 255, 255) outputted from the color conversion circuit 2, by only the K plate and, simultaneously, to reproduce a solid black portion of the picture image such as (C', M', Y')=(254, 254, 254) outputted from the color conversion circuit 3 by C, M, Y, K colors.

Figure 3A:
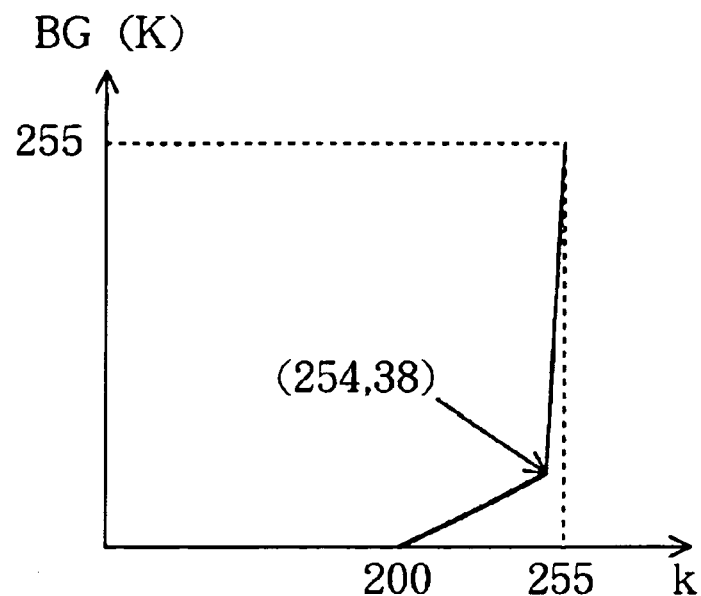
FIGS. 3a and 3b show examples amounts of the BG and UCR processing optimized for reproduction of character and picture images, respectively.
Figure 3B:
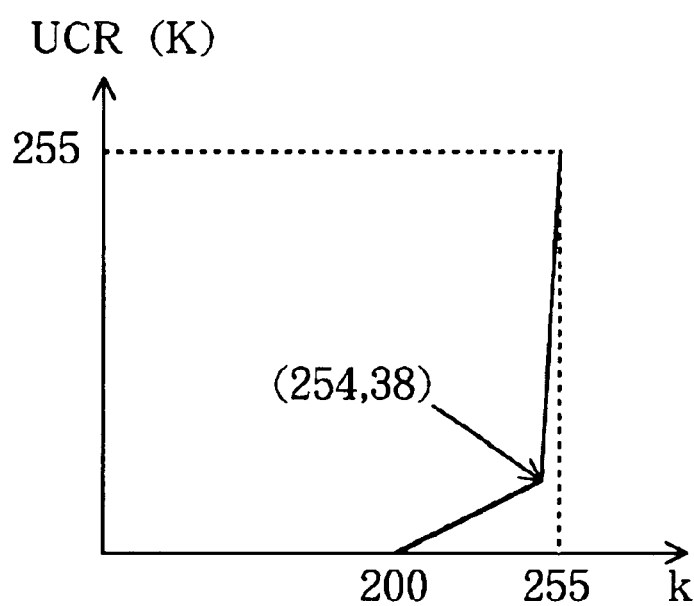

FIGS. 3a and 3b show examples of the amount of the BG processing and the amount of the UCR processing in the BG/UCR table 4. In the reproduction of the picture image, it is usually ideal to not perform the BG/UCR processing if the continuity of gradation is important. However, when C, M and Y colors having high concentration such as solid or close to solid are superposed, thickness of the toner layer in an image printing processor is increased causing a load of a fixing roller thereof to be increased. Further, such superposition of the colors is disadvantageous in view of a running cost. Therefore, in the region in which the value of k becomes large, the BG/UCR processing within a range in which it satisfies the specification of the printer engine becomes indispensable. Although, in this embodiment, the BG/UCR table 4 is set such that, in order to reproduce a high quality picture image, a small amount of the BG/UCR processing in only a region in which the value of k becomes large, such setting does not limit the present invention.

Referring to FIGS. 3a and 3b, the BG/UCR processing is started from a case of k=200, the amount of the BG/UCR processing is linearly increased up to k=254. At k=254, an amount of 38/255 of the BG/UCR processing is generated and the 100% BG/UCR processing is performed at only k=255.

Describing the 100% BG/UCR processing, the value of k becomes 255 only when the (C', M', Y') data inputted to the BG/UCR table 4 is (C', M', Y')=(255, 255, 255). Inserting this into the formula (1) to (5), the following equations are obtained:

$$C = C' < UCR(k) = 255 - 255 = 0 \quad (2')$$

$$M = M' - UCR(k) = 255 - 255 = 0 \quad (3')$$

$$Y = Y' - UCR(k) = 255 - 255 = 0 \quad (4')$$

$$K = BG(k) = 255 \quad (5')$$

The BG/UCR table 4 outputs (C, M, Y, K)=(0, 0, 0, 255) in only the case where the above equations are established. In this embodiment, the color conversion circuit 2 outputs (C', M', Y')=(255, 255, 255) only when a solid black data inputted thereto as shown in FIGS. 2a and 2b, and calculation results of the equations (2') to (5') are applied. This means that, when black characters are contained in the input data, the characters are printed by the K color.

However, the (C', M', Y') data generated by the color conversion circuit 3 does not take k=255 even when a solid black data is inputted thereto, as shown in FIG. 2b. Therefore, there is no 100% BG/UCR processing performed for the (C', M', Y') data inputted from the color conversion circuit 3 to the BG/UCR table 4. To the BG/UCR processing in this case, BG(k) and UCR(K) of the BG/UCR table 4 when k≦254 is applied correspondingly to the value of k generated by the color conversion circuit 3. In FIG. 2b, the color conversion circuit 3 converts an input of solid black data into (C', M', Y')=(254; 254, 254) and k=254 enters in the BG/UCR table 4.

According to FIGS. 3a and 3b, when k=254, it becomes BG (k)=UCR (k)=38. By applying this result to the equations (1) to (5), the following equations are obtained:

$$C = C' - UCR(k) = 254 - 38 = 216 \quad (2'')$$

$$M = M' - UCR(k) = 254 - 38 = 216 \quad (3'')$$

$$Y = Y' - UCR(k) = 254 - 38 = 216 \quad (4'')$$

$$K = BG(k) = 38 \quad (5'')$$

Therefore, the BG/UCR table 4 outputs the solid black portion as (C, M, Y, K)=(216, 216, 216, 38). This means that the solid black portion in the picture image is reproduced by C, M, Y and K colors. Since, therefore, there is no portion in the output picture image, which is reproduced by only the K plate, no gap of hue, chromaticness or lightness exists in the output photograph image.

As mentioned, according to this embodiment, the character image is reproduced by only the K plate and the solid black portion of the photograph image is reproduced by C, M, Y and K colors unlike the conventional technique in which completely different processings are performed in a border region between a character image and a picture image. Therefore, it is possible to realize the high quality simultaneous reproduction of characters and photographs, to thereby remove non-continuity at adjacent points of a non-picture image and a picture image and obtain an entirely smooth high quality image. Further, since it is enough, in order to print a high quality color image, to convert the character image and the picture image into (C', M', Y') data, respectively, and convert the (C', M', Y') data into (CMYK) signals, respectively, by using the BG/UCR table 4, it is possible to make a construction of the color image processor compact.

Figure 4:
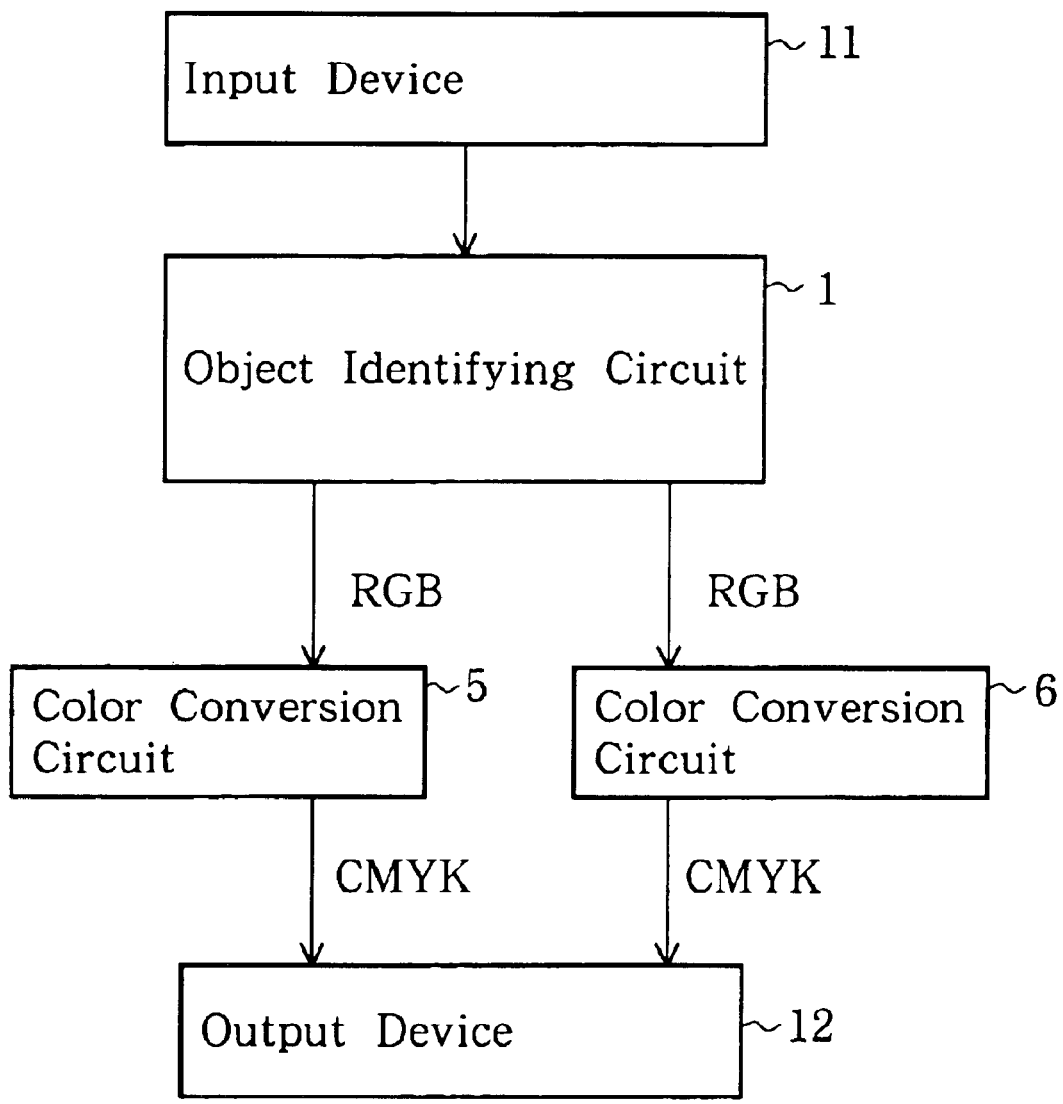
FIG. 4 is a block circuit diagram showing a construction of a color image processor according to a second embodiment of the present invention.

A second embodiment of the present invention will be described with reference to FIG. 4. In FIG. 4, a (R, G, B) data is directly converted into a (C, M, Y, K) data by using a LUT. Since the acquisition of an input image data from a input device 11 and the operations of an object identifying circuit 1 and an output device 12 are similar to those of the first embodiment, details thereof are omitted to avoid duplication.

A color conversion circuit 5 converts a (R, G, B) data of non-picture image format into a (C, M, Y, K) data and outputs (C, M, Y, K)=(0, 0, 0, 255) for an input of (R, G, B)=(0, 0, 0). A color conversion circuit 6 converts a (R, G, B) data of a picture image format into a (C, M, Y, K) data and is set such that it performs a printing with using C, M, Y and K colors by, for example, outputting (C, M, Y, K)=(216, 216, 216, 38) for an input of (R, G, B)=(0, 0, 0).

In the second embodiment, the color conversion circuit 5 for processing the input data of the non-picture image format and the color conversion circuit 6 for processing the input data of the picture image format concurrently utilize the processing of the BG/UCR table 4 of the first embodiment. That is, the color conversion circuit 5 performs the function of the color conversion circuit 2 of the first embodiment and the processing of the BG/UCR table 4 and the color conversion 6 performs the function of the color conversion circuit 3 of the first embodiment and the processing of the BG/UCR table 4, so that the construction of the color image processor becomes compact and the processing time can be reduced.

In the above description, the gradation is defined by 8 bits. When the gradation is presented by 9 bits, the same effect can be obtained by, in converting a (R, G, B) data of non-picture format into a (C, M, Y, K) data, outputting (C, M, Y, K)=(0, 0, 0, 511) for an input (R, G, B)=(0, 0, 0) and, in converting a (R, G, B) data of picture format into a (C, M, Y, K) data, outputting (C, M, Y, K)=(432, 432, 432, 76) for an input (R, G, B)=(0, 0, 0).

Although, in the above description, the printer engine is driven by the CMYK signal, it is possible to store the CMYK signal in a recording medium such as magnetic recording medium as a package soft.

According to the present invention, the character image is reproduced by only the K plate and, simultaneously, the solid black portion of the picture image is reproduced by C, M, Y and K colors. Therefore, it is possible to simultaneously realize the high quality reproduction of both characters and photographs to thereby remove discontinuity in a border region between non-picture image and picture image and obtain a high quality image which is entirely smooth. Further, since it is enough to use only one BG/UCR table by setting the output values of the LUT different from each other when the solid black data is inputted, the construction of the color image processor becomes simple.

What is claimed is:

1. A color image processor for converting an input image data containing color-separated red, green and blue color input signals into an output image data containing cyan, magenta, yellow and black color output signals, which are used in a color output device, comprising:

an object identifying circuit for determining whether a data format of the input image data is a non-picture format or a picture format;

first processing means, responsive to said object circuit, for performing a color conversion of the input image data of the non-picture image format and, when values of the respective color-separated input signals are minimum, making values of the respective cyan, magenta and yellow color output signals minimum and a value of the black color output signal maximum; and second processing means, responsive to said object identifying circuit, for performing a color conversion of the input image data of the picture image format, setting the cyan, magenta and yellow color output signals to temporary values slightly smaller than maximum values, when the values of the respective color-separated input color signals are minimum, and obtaining final cyan, magenta, yellow and black color output signals by processing the temporary values by a Black-Generation land Under-Color-Removal (UCR) processing corresponding to said color output device.

2. A color image processor as claimed in claim 1, wherein said first processing means and said second processing means include common BG/UCR processing means for performing the Black-Generation and Under-Color-Removal processing, said first processing means includes a first color conversion circuit for converting the red, green and blue color-separated input signals of the input image data of the non-picture format into the cyan, magenta and yellow color output signals, setting the values of the cyan, magenta and yellow color output signals to the maximum, respectively, when the values of the color-separated red, green and blue color input signals are minimum, respectively, and outputting the cyan, magenta and yellow color output signals having the maximum values to said common BG/UCR processing means, said second processing means includes a second color conversion circuit for converting the red, green and blue color-separated signals of the input image data of the picture format into the cyan, magenta and yellow color output signals, setting the values of the cyan, magenta and yellow color output signals to values slightly smaller the maximum values, respectively, when the values of the color-separated red, green and blue color input signals are minimum, respectively, and outputting the cyan, magenta and yellow color output signals having the set values to said common BG/UCR processing means and said common BG/UCR processing means includes a look-up table for outputting, for signals containing the cyan, magenta and yellow color output signals having the respective maximum values, the image output data including the cyan, magenta and yellow color output signals having the respective minimum values and the black color output signal having the maximum value and, for signals containing the cyan, magenta and yellow color output signals, at least one of which has a value smaller than the maximum value thereof, the image output data corresponding to said color output device.

3. A color image processor as claimed in claim 2, wherein an amount of the Black-Generation and Under-Color-Removal processing is set in said look-up-table such that a continuity between the color image data of the non-picture image format and the color image data of the picture image format is maintained.

4. A color image processor as claimed in claim 2, wherein an amount of the Black-Generation and Under-Color-Removal processing for only a color region in which the values of the cyan, magenta and yellow color output signals are close to the maximum values, respectively, is set in said look-up-table.

* * * * *